United States Patent
Sellers

(10) Patent No.: US 9,003,358 B2
(45) Date of Patent: Apr. 7, 2015

(54) METHOD OF TAKING A COMPUTER ARCHITECTURE RESPRESENTATION AND GENERATING MANUFACTURING METHODS CAPABLE OF MANUFACTURING A COMPUTER SYSTEMS CONTAINED IN A SPECIFICATION

(71) Applicant: Russell Sellers, Austin, TX (US)

(72) Inventor: Russell Sellers, Austin, TX (US)

( * ) Notice: Subject to any disclaimer, the term of this patent is extended or adjusted under 35 U.S.C. 154(b) by 0 days.

(21) Appl. No.: 14/206,106

(22) Filed: Mar. 12, 2014

(65) Prior Publication Data

US 2014/0282362 A1 Sep. 18, 2014

Related U.S. Application Data

(60) Provisional application No. 61/800,387, filed on Mar. 15, 2013.

(51) Int. Cl.

| | |
|---|---|
| *G01R 21/00* | (2006.01) |
| *G01R 21/06* | (2006.01) |
| *G06F 3/048* | (2013.01) |
| *G06F 11/22* | (2006.01) |
| *G06F 17/50* | (2006.01) |
| *G06F 9/44* | (2006.01) |
| *G06F 9/45* | (2006.01) |
| *G06F 9/445* | (2006.01) |
| *G06F 17/30* | (2006.01) |

(52) U.S. Cl.
CPC ...................................... *G06F 8/20* (2013.01)

(58) Field of Classification Search
CPC ... G06F 8/10; G06F 9/30181; G06F 15/7867; G06F 17/5022; G06F 17/30867; G06F 21/34; G06F 11/1433
See application file for complete search history.

(56) References Cited

U.S. PATENT DOCUMENTS

| | | | |
|---|---|---|---|
| 5,754,857 A | 5/1998 | Gadol | |
| 5,877,966 A * | 3/1999 | Morris et al. | 716/136 |
| 6,199,068 B1 * | 3/2001 | Carpenter | 702/62 |
| 6,247,128 B1 * | 6/2001 | Fisher et al. | 717/178 |
| 7,278,133 B2 * | 10/2007 | Roman et al. | 717/120 |
| 7,340,520 B1 | 3/2008 | Jordan et al. | |
| 7,406,483 B2 | 7/2008 | Leymann et al. | |
| 7,725,817 B2 * | 5/2010 | Krasun et al. | 717/143 |
| 8,191,059 B1 | 5/2012 | Litman et al. | |
| 8,650,506 B2 * | 2/2014 | Erickson et al. | 715/849 |
| 8,677,505 B2 * | 3/2014 | Redlich et al. | 726/27 |
| 2004/0046789 A1 * | 3/2004 | Inanoria | 345/748 |
| 2005/0289485 A1 * | 12/2005 | Willis | 716/1 |
| 2006/0184926 A1 | 8/2006 | Or et al. | |
| 2008/0222734 A1 * | 9/2008 | Redlich et al. | 726/26 |
| 2008/0250360 A1 * | 10/2008 | Willis | 716/2 |
| 2009/0048889 A1 * | 2/2009 | Arinez et al. | 705/8 |
| 2013/0080997 A1 * | 3/2013 | Dattathreya | 717/121 |

* cited by examiner

*Primary Examiner* — Don Wong
*Assistant Examiner* — Anibal Rivera
(74) *Attorney, Agent, or Firm* — Hulsey Calhoun P.C.

(57) ABSTRACT

Techniques and a system for creating a vendor independent computer language and compiling the language into an architecture specification language allowing for taking a source data stream (file, WSDL, XML) and passing thru a language parser, populating a storage medium with a plurality of technical inputs and vendor technical specifications for generic technologies and probable technologies required for desired architectures generated by the language parser, and optimizing the inputs and creating relationships between technologies and groups of technologies and storing results in the storage medium.

20 Claims, 6 Drawing Sheets

METHOD OF TAKING A COMPUTER ARCHITECTURE RESPRESENTATION AND GENERATING MANUFACTURING METHODS CAPABLE OF MANUFACTURING A COMPUTER SYSTEMS CONTAINED IN A SPECIFICATION

CROSS-REFERENCE TO RELATED APPLICATIONS

This application claims priority to U.S. Provisional Patent Application Ser. No. 61/800,272, and U.S. Provisional Patent Application Ser. No. 61/800,387, both filed on Mar. 15, 2013, which are hereby incorporated by reference in its entirety. Other related applications having common inventorship and/or ownership as may mentioned throughout this disclosure, are also incorporated by reference in their entirety.

FIELD

The disclosed subject matter relates to methods of taking a computer architecture representation and generating manufacturing methods capable of manufacturing the computer systems contained in the specification. The invention also includes an enhanced means of executing those applications and causing the specified systems to be built on demand.

DESCRIPTION OF THE RELATED ART

The traditional method is for an engineer to take a high-level design specification and for the engineer to research and use vendor specific documentation of commands and his individual knowledge and experience to determines the necessary equipment, creates a Bill of Material, creates a low level design, and creates implementation instructions. To deploy the system, for each system to be deployed, the engineer takes the implementation instructions executes the commands in the implementation instructions necessary to create the systems. He then creates operating instructions for operating the systems and executes those to place the system under operational management. An alternate method is for an engineer to code the commands he would execute into a service catalog or a provisioning tool. The problem that this creates is that the engineer is manually mapping the high-level design to the individual commands necessary to implement that high-level design and then either manually executing those command as placing those commands in a service catalog or provisioning tool. If the end user decides to transition from one technology to another they have to have this mapping recreated potentially by a completely different engineer with the appropriate knowledge of the commands on the desired technology. A significant amount of the information gathered and generated for the initial implementation is not retained and usable for subsequent designs.

SUMMARY

Techniques here disclosed include a method and system for generating a computer architecture representation in a reusable syntax and grammar. As a result the invention also includes an enhanced means of creating artifacts such as high-level design documents, bills of materials and traditional drawings.

The present invention provides a method of generating a computer architecture representation in a reusable syntax and grammar, wherein a plurality of language definitions that include at least a first language definition for technical specifications and attributes. This information is typically submitted by an engineer, and comes in the form of multiple specifications and may include vendor technical specifications, best practices, and corporate best practices.

Technical Specifications for applications may include, but are not limited to, details such as memory required, disk space required. Technical specifications for operating systems may include, but are not limited to, hardware limitations such as required physical memory, processor type. Industry best practice details may include, but are not limited to, that although the vendor recommends a certain amount of memory for an application, the industry best practice is two times that amount.

The term "technical specification" is understood herein as any data that is provided by an engineer or manufacturer, detailing technology including but not limited to operating system requirements, application requirements, or hardware requirements. As an exemplary scenario, a technical specification for Windows® 2012 Server® may specify minimum processor: 1.4 Ghz 64-bit processor, minimum ram: 512 MB, minimum disk: 32 GB.

In accordance with an embodiment of the invention the method provides a second language definition for business details and attributes. This information is typically provided by the user and includes but not limited to goals, decisions, constraints, site details and user details. A decision may include, but is not limited to, a selection of a particular vendor. Business details may include, but are not limited to, number of locations, size of locations, and users at locations.

The term "business details" and "business attributes" is understood herein as any data that is provided by a user that is specific to their business environment. As an exemplary scenario, a business attribute may specify to use the industry best practice over the vendor specification.

In accordance with a further embodiment of the invention, the method provides third language definition supplementary details and attributes. This information is custom data that can be customer or implementation dependent. An example supplemental detail may be able to be to a specific vendor or technology bias.

The term "supplementary details" and "supplementary attributes" is understood herein as any data that is provided by a user as custom data. As an exemplary scenario, a user may specify a operating system or manufacturer bias, such as Microsoft® is a preferred vendor. Algorithms selected at runtime may use this supplemental data for decisions.

In an embodiment of the invention, the method provides for parsing and performing semantic grammar analysis for each of the language definitions that consist of reading each line of input, parsing and performing semantic grammar analysis of attributes of the specification, elements or lines, element lists/groups and attributes of the list/group, individual elements or lines and attributes of the elements, and finally individual lines or elements within a list/group and any attributes of that element and produce an intermediate representation as reusable individual elements and attributes. In some embodiments of the invention, the method may include a means of deconstructing these specifications into reusable elements, which provides the advantage that elements may be reused in a plurality of designs.

In an embodiment of the invention, the method has a means for dynamically compile and generate an architectural specification based on user selected data, the produced intermediate representation, and an algorithm selected at run time that consists of reading each input variable and passing those variables to the specified algorithm. The algorithm processes the individual elements and attributes based on the defined algorithm. The output of the selected algorithm is then passed to the compiler to generate the architecture specification in a specific language definition.

The term "architecture representation" is understood herein as a data structure for storing and representing the data contained in a high-level design in a generic reusable way.

In accordance with a further embodiment of the invention, the method has a means for dynamically compile and generate an architectural specification based on user selected data, the produced intermediate representation, supplemental details and attributes, and an algorithm selected at run time that consists of reading each input variable and passing those variables to the specified algorithm. The algorithm processes the individual elements and attributes based on the defined algorithm. The output of the selected algorithm is then passed to the compiler to generate the architecture specification in a specific language definition.

In accordance with a further embodiment of the invention, the method provides a means for dynamically generating industry standard technical documents from a generated architecture specification.

In another aspect the invention is directed to a system implementing the above described language specifications, methods and compiler mechanism.

Embodiments of the invention have the advantage that different architectures are capable of being generated rapidly based on a broader set of technical and engineering inputs than the conventional methods.

In accordance with an embodiment of the invention, the system further provides means for receiving a source data stream of input information from the user. Memory means allow for a data structure instantiating code segment that establishes a storage record in memory, as well as for storing technical input records, business input records, relationships, and architecture specification language representation. A processor means operates for parsing and performing semantic grammar analysis for each of the language definitions, as well as recording parsed results to the storage medium. The processor means further enables executing a selected optimization function to optimize and create relationships and saving the results to the storage medium. The disclosure includes executing a compilation function to compute and create an architectural representation in the specified syntax and grammar.

In accordance with a further embodiment of the invention, the system further provides means for receiving a source data stream of input information from the user. Memory means enable a data structure instantiating code segment that establishes a storage record in memory and for storing technical input records, business input records, relationships, supplemental details and attributes, and architecture specification language representation. A processor means operates parsing and performing semantic grammar analysis for each of the language definitions including supplemental details and attributes, recording parsed results to the storage medium, executing a selected optimization function to optimize and create relationships and save results to the storage medium, as well as executing a compilation function to compute and create an architectural representation in the specified syntax and grammar.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features, and advantages here provided will become apparent to one with skill in the art upon examination of the following FIGUREs and detailed description. It is intended that all such additional systems, methods, features and advantages be included within this description, be within the scope of the accompanying claims.

BRIEF DESCRIPTIONS OF THE DRAWINGS

The features, nature, and advantages of the disclosed subject matter will become more apparent from the detailed description set forth below when taken in conjunction with the drawings in which like reference characters identify correspondingly throughout and wherein:

FIG. 1 provides a UML use case diagram being illustrative of an embodiment of a method of the invention;

APPENDIX 1 shows exemplary grammar for a specification file;

APPENDIX 2 shows exemplary grammar for a specification file; and

APPENDIX 3 shows a shows exemplary implementation of the grammar in APPENDIX 1 but in XML as an alternative format.

DETAILED DESCRIPTION OF THE SPECIFIC EMBODIMENTS

Figure 1:
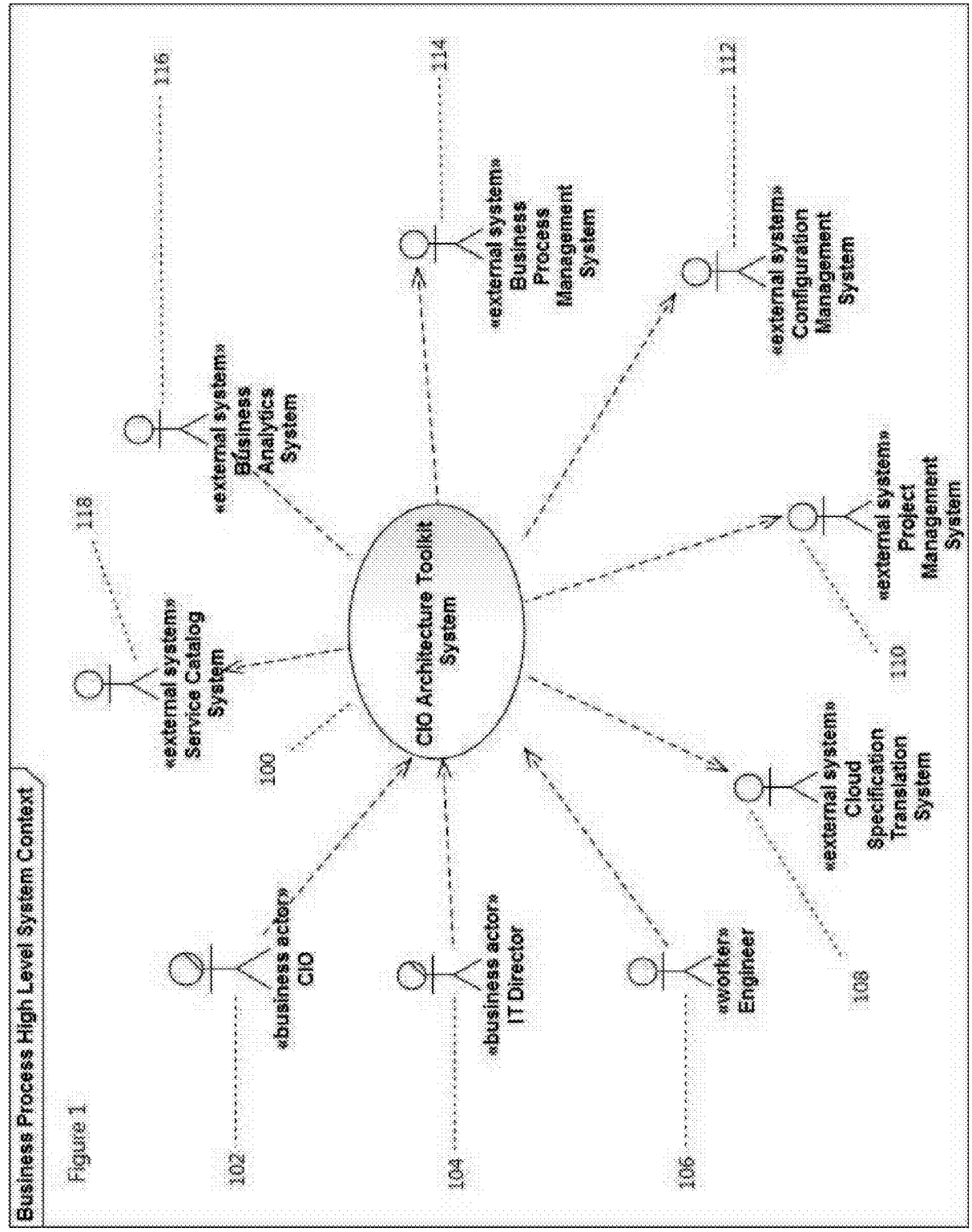

FIG. 1 is illustrative of an embodiment where an actor element 106 shows the information flow from the engineer into the method represented as element 100. FIG. 1 also shows other actors that may interface with the method in an exemplary embodiment.

Figure 2:
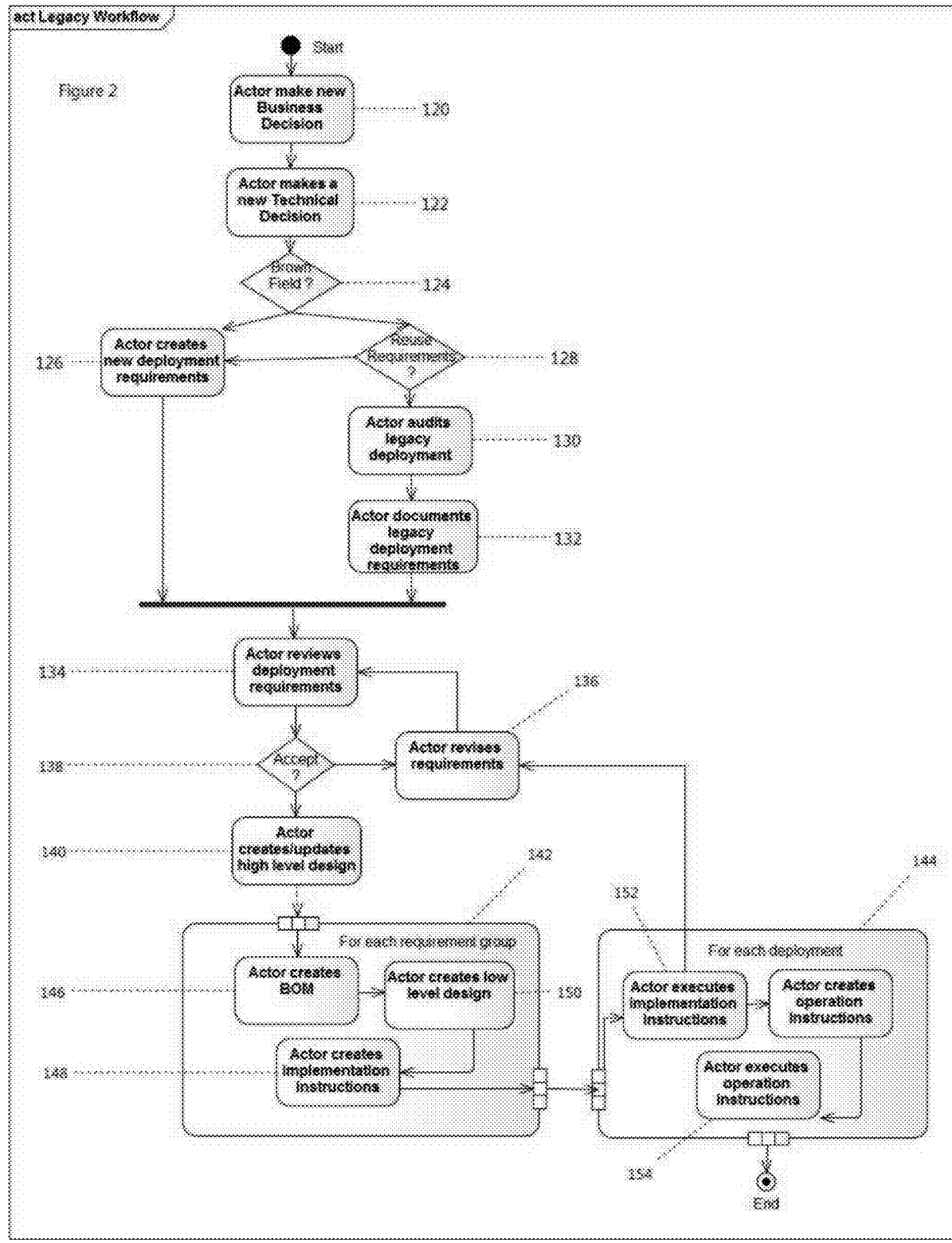
FIG. 2 is a UML activity diagram being illustrative of the conventional workflow for creating a high-level design.

FIG. 2 is illustrative of an embodiment where an actor 102, 104, or 106 from FIG. 1 makes a business decision to deploy a particular application or technology 120. An actor 102, 104 or 106 from FIG. 1, takes that business decision as input and make a series of technical decisions 122. The actor must make a decision 124 if the deployment is a new deployment or a deployment over an existing "Brown Field." If the deployment is a new deployment 126, then a new set of requirements are developed. If there is an existing deployment the actor must make a decision 128 to reuse existing requirements. If the actor chooses not to reuse existing requirements then the deployment is treated as a new deployment 126 and a new set of requirements are developed. If the actor chooses to reuse the existing requirements then an audit of the legacy deployment must be performed 130 and the requirements documented 132. The actor reviews the resulting requirements 134 for acceptance 138. If they do not meet the business decisions 120 and technical decisions 122 then they are not accepted the requirements are revised 136. If the requirements are accepted the actor generates by hand a high-level design document 140 based on his individual knowledge and experience. An actor then takes this high-level design, and for each requirement contained in the high-level design 142 he determines the necessary equipment, creates a Bill of Material 146, creates a low level design 150, and creates implementation instructions 148. To deploy the system, for each system to be deployed 144, the actor takes the implementation instructions 148 and executes them 152 to create the systems. He then creates operating instructions 156 for operating the systems and executes those 154 to place the system under operational management.

Figure 3:
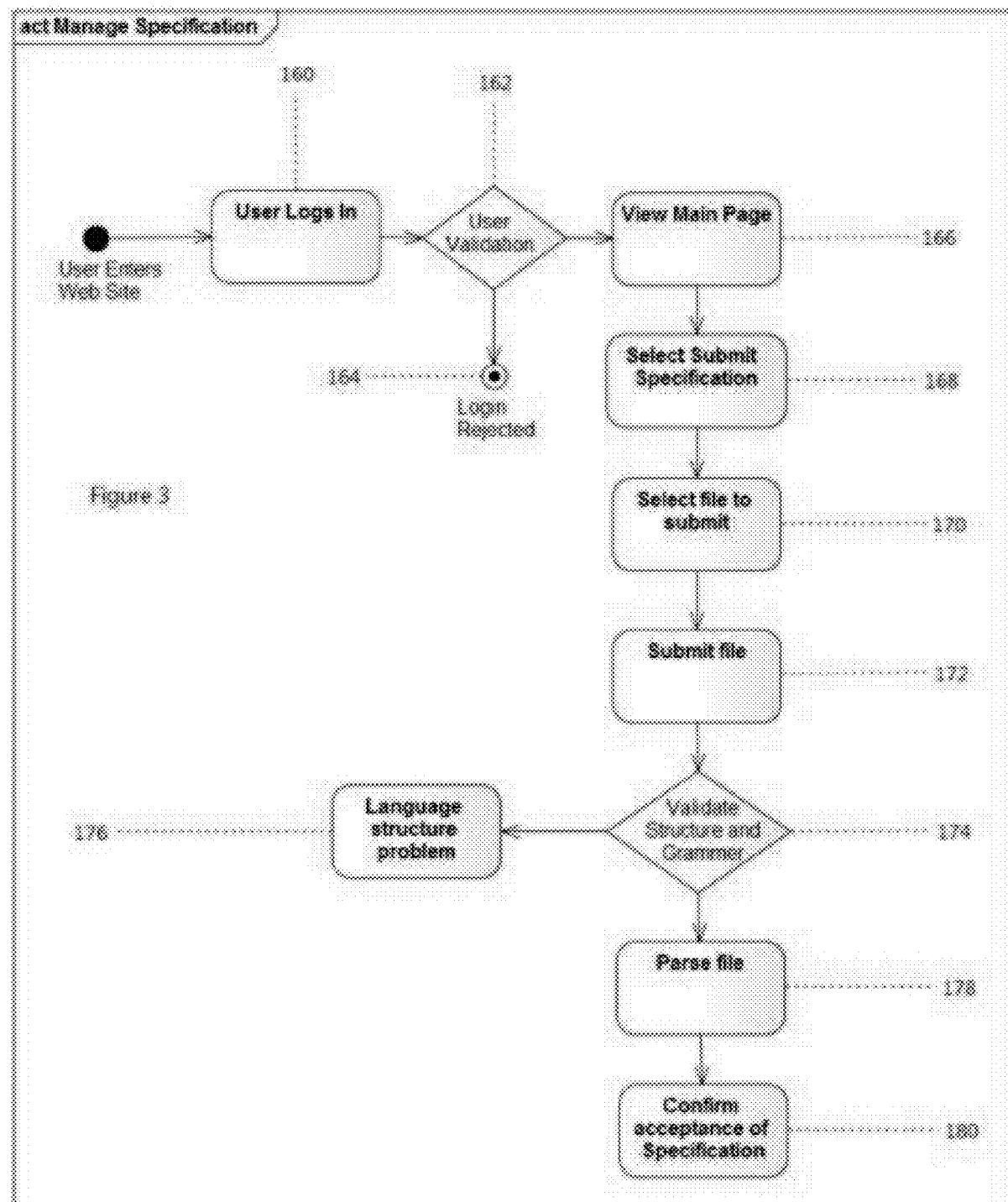
FIG. 3 is a UML activity diagram being illustrative of an embodiment of a method of submitting a specification for use as part of the body of reusable information.

FIG. 3 is illustrative of an embodiment where an actor submits a specification for use by the exemplary embodiment as part of the body of reusable information. Elements 160 thru 168 represent an interaction with the user interface of the system. An actor 106 from FIG. 1 attempt to access the system 160. If authentication 162 fails the access is denied 164. If authentication 162 is successful the main page 166 is displayed. The user selects select a specification file 168 and selects a specification file for use 170. The user then submits the file 172 for use. Lexical and syntactical analysis is performed on the submitted data to determine if the data is a valid structure and grammatical syntax 174. If the lexical or syntactical analysis fails there is a language or structure problem 176. If the lexical and syntactical analysis passes then the file is parsed 178 and the information retained for later use. A positive confirmation is provided of acceptance of the specification 180.

Figure 4:
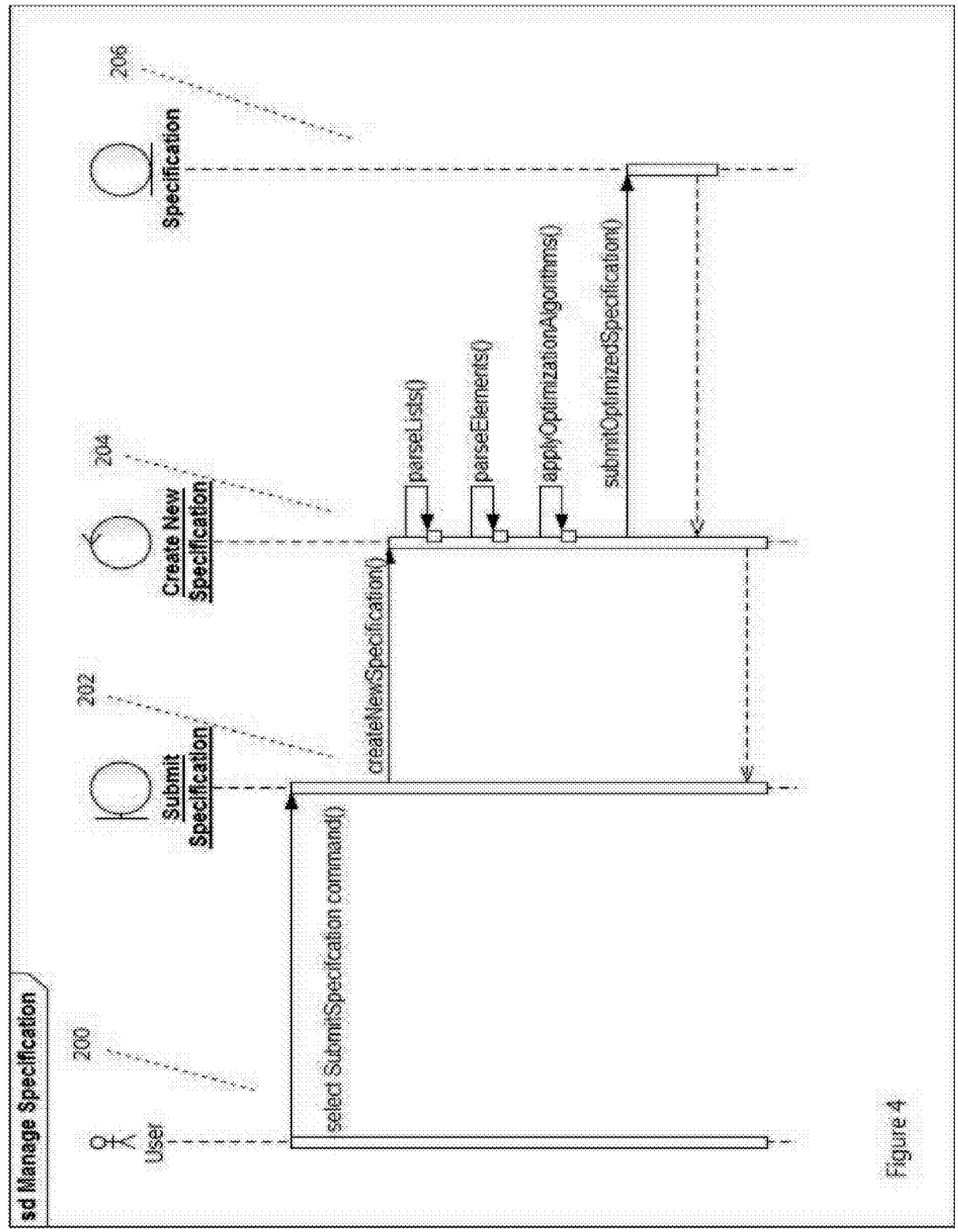
FIG. 4 is a UML sequence diagram being illustrative of an embodiment of a method of processing or deconstructing a specification.

FIG. 4 is illustrative of an embodiment where a user 200 interacts with the system via the Submit Specification boundary 202. The Create New Specification control 204 mediates between the Submit Specification boundary 202 and the Specification entity 206 and orchestrates the behavior including but not limited to the parsing of the lists, elements and execution of the algorithms.

Figure 5:
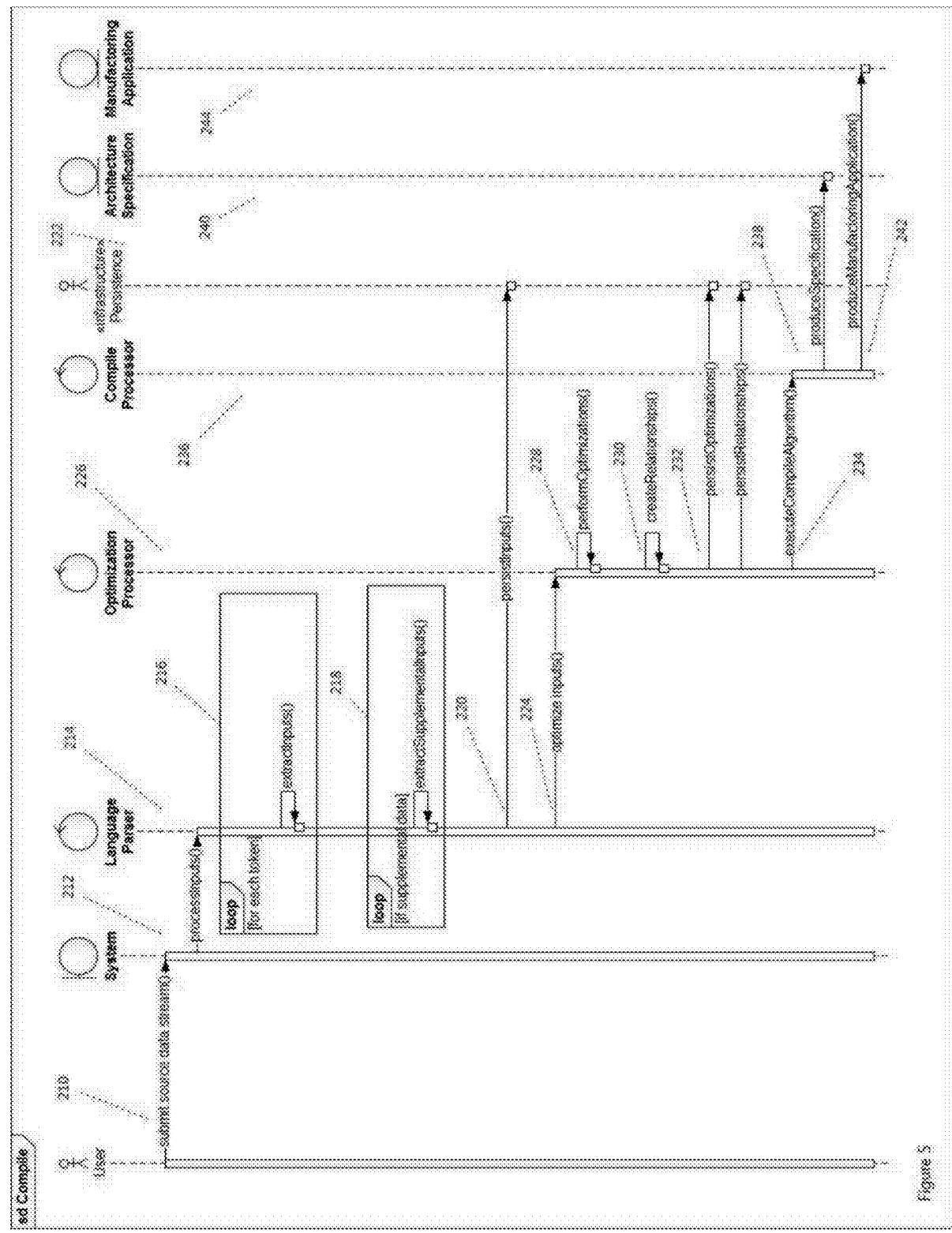
FIG. 5 is a UML sequence diagram being illustrative of an embodiment of a method of the invention.

FIG. 5 is illustrative of an embodiment where an actor interacts with the system via the System boundary 212. The Language Parser control 214 receives the inputs from the System boundary 212 and processes the inputs. The Language Parser control 214 loops thru the specification and extracts the inputs. If supplemental data is present in the source data stream the Language Parser control 214 loops thru the specification and extracts supplemental data and attributes. Once the inputs have been extracted the Language Parser control 214 persists the inputs to Persistence actor 222 via the persistInputs( ) message 220. The Language Parser control 214 then passes control to the Optimization Processor control 226 to performOptimizations( ) 228 of inputs and createRelationships( ) 230. The Optimization Processor control 226 then persistOptimizations( ) 232 and persistRelationships( ) to persist the data to the Persistence actor 222. Once the Optimization processor control 226 has persisted its data it passes control to the Compile processor control 236. The Compile Processor control 236 produces either a Architecture Specification entity 240 or a Manufacturing Application entity 244 depending on the embodiment.

Figure 6:
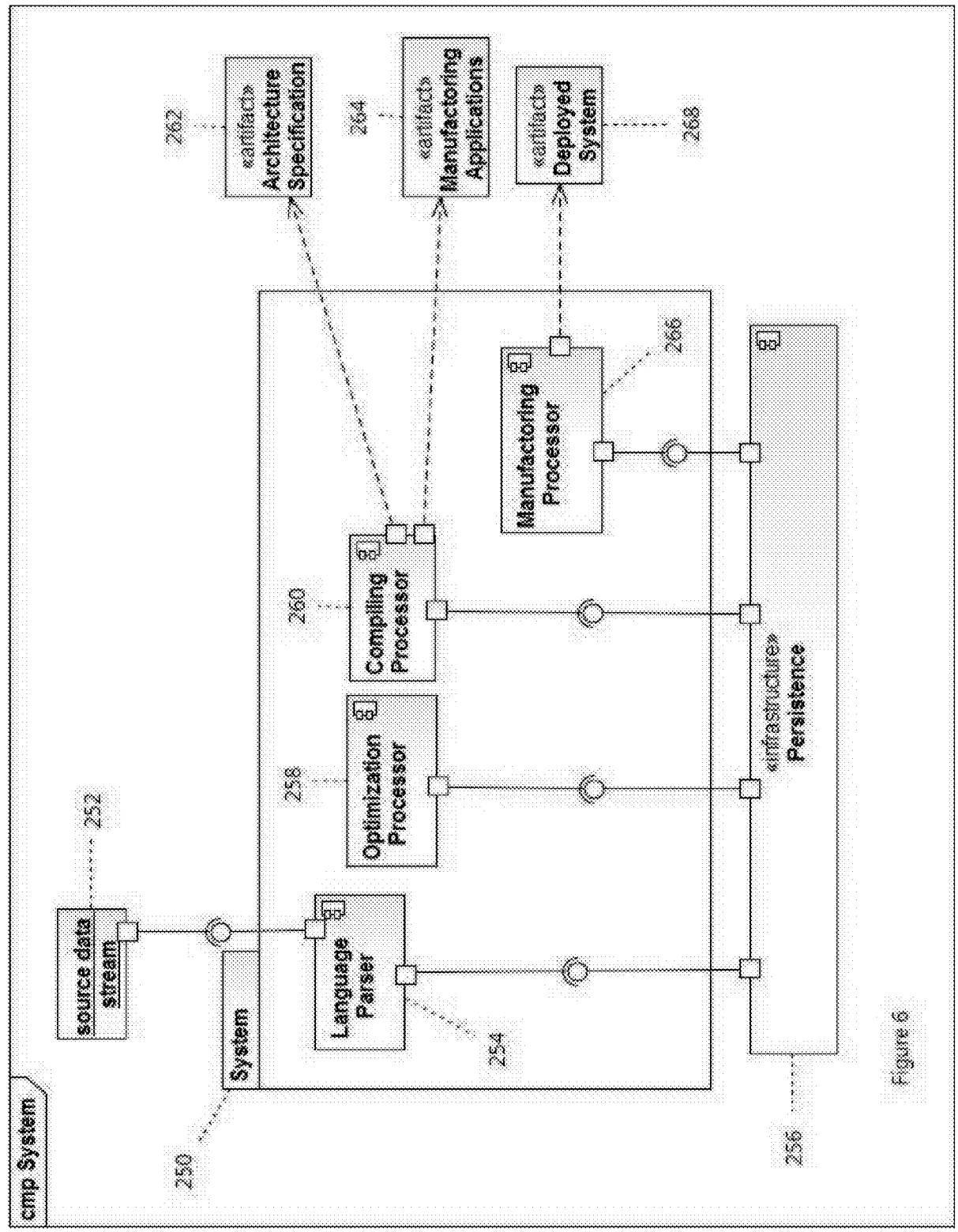
FIG. 6 is a UML component diagram being illustrative of an embodiment of a computer system of the invention.

FIG. 6 is illustrative of an embodiment where a source data stream object 252 is submitted to the computer System 250 via a computer network for processing. The Language Parser component 254 is invoked and uses the system processor to calculate and extract the inputs from the data stream. The Language Parser component 254 persists its data to the Persistence component 256 which may be a database or system memory data structure. The Optimization Processor component 258 is invoked to retrieve the inputs from the Persistence component 256 and uses the system processor to execute an optimization algorithm and create necessary relationships. The Optimization Processor component 258 persists its data to the Persistence component 256. The Compiling Processor component 260 is invoked to retrieve the optimized inputs and relationships from the Persistence component 256 and uses the system processor to execute a compilation algorithm to generate either an Architecture Specification artifact 262 or a Manufacturing Applications artifact depending on the embodiment. In a further embodiment of the system the Manufacturing Processor component 266 will be invoked to use the system processor to execute the Manufacturing Applications artifacts 264 to create the Deployed Systems artifact 268.

To facilitate the processing of specifications a new grammar and syntax may be required. The listing in APPENDIX 1 and APPENDIX 2 are exemplary grammar for a specification file that may be used as inputs to the methods described in FIG. 3 and FIG. 4. The listing in APPENDIX 3 shows a possible implementation of the grammar in APPENDIX 1 but in XML as an alternative format.

A method of consuming a high-level design or computer architecture representation and generating manufacturing methods capable of manufacturing the computer systems contained in the specification, comprising the steps of taking a source data stream (file, WSDL, XML) passing thru a parser. The process includes populating a storage medium with a plurality of application programming interfaces (api's), commands, and vendor implementation specifications for specific technologies required for architectures generated by the language parser, as well as optimizing the inputs and creating relationships between commands and groups of commands or api's required to implement portions of the architecture and storing results in the storage medium.

The disclosed method further includes the steps of further populating the storage medium with supplemental attributes. The may employ a compiling algorithm to retrieve inputs and a high-level design stored in an architectural specification language from the storage medium and produce a plurality of system manufacturing applications. Also, the method may employ a compiling algorithm to retrieve from the storage medium a high-level design stored in an architectural specification language and inputs and/or supplemental attributes, and produce a plurality of system Manufacturing applications Another embodiment of the present disclosure includes a system for consuming a high-level design or computer architecture representation and generating manufacturing applications capable of manufacturing the computer systems contained in the specification. This embodiment may include a language parser communicating with the storage medium and coupled to a computer network for parsing vendor implementation specifications, api's, and commands into individual inputs and value pairs and records those inputs to the storage medium. An optimization processor may communicate with the storage medium and coupled to a computer network for optimizing parsed inputs and creates relationships and records those inputs to the storage medium. Moreover, a language parser may communicate with the storage medium and coupled to a computer network for parsing computer architecture representations and records those inputs to the storage medium. Then, a compiling processor communicating with the storage medium and coupled to a computer network for retrieving inputs from the storage and generating a plurality of system manufacturing applications, while a manufacturing server coupled to a computer network and having memory and processor stores and executes the manufacturing applications. The server preferably conducts a manufacturing transaction with a user and either delivering the manufacturing applications to the user or executing the manufacturing applications directly. Such a system embodiment may further include a language parser communicating with the storage medium and coupled to a computer network for parsing supplemental attributes into individual inputs and value pairs and records those inputs to the storage medium.

Yet a further embodiment of the present disclosure may include a computer program embodied on a computer-readable medium for creating a vendor implementation computer language. The computer program embodiment may include a data structure for instantiating code segment that establishes a storage record in memory. Such a data structure may include a command/api identifier, as well as a plurality of separate command or api records, each maintaining a pointer to the command/api identifier. Here compiling algorithm may include instructions for deconstructing a high-level design, identifying commands to execute in order to create the architecture represented, and constructing and compiling manufacturing applications necessary to execute identified commands.

This embodiment contemplates the use of a data structure instantiating code segment that establishes a storage record in memory having, an architecture specification identifier, and a plurality of technical input records and business input records, each maintaining a pointer to said architecture specification identifier. Here, a compiling algorithm provides instructions for deconstructing the computer architecture representation, identifying commands to execute in order to create the architecture represented, and constructing and compiling manufacturing applications necessary to execute identified commands.

The processing features and functions described herein for generating a computer architecture representation in a reusable syntax and grammar. The disclosed subject matter provides an enhanced means of creating artifacts such as high-level design documents, bills of materials and traditional drawings that may be implemented in various manners. Moreover, the process and features here described may be stored in magnetic, optical, or other recording media for reading and execution by such various signal and instruction processing systems. The foregoing description of the preferred embodiments, therefore, is provided to enable any person skilled in the art to make or use the claimed subject matter. Thus, the claimed subject matter is not intended to be limited to the embodiments shown herein but is to be accorded the widest scope consistent with the principles and novel features disclosed herein.

APPENDIX 1

Example Specification Language Structure

```
%token STRING
specification:
            attribute_element requirement_element
        |   attribute_element requirement_element_list
requirement element
    ;
attribute_element:
            element TYPE literal
    ;
requirement_element_list:
            requirement_element
        |   requirement_element_list requirement_element
    ;
requirment_element:
            element
    ;
element:
            VALUE literal
literal:
            STRING
```

APPENDIX 2

Example Architecture Specification Language Structure

```
%token STRING
Architecture specification:
            attribute_element deployment_element
        |   attribute_element_list deployment_element
        |   attribute_element deployment_element_list
deployment_element
        |   attribute_element_list deployment_element_list
            attribute element deployment element
    ;
attribute_element_list:
            attribute_element
        |   attribute_element_list attribute_element
    ;
attribute_element:
            element TYPE literal
    ;
deployment_element_list:
            deployment_element
        |   deployment_element_list deployment_element
    ;
deployment_element:
            DEPLOYMENT literal
        |   DEPLOYMENT literal TYPE literal
    ;
provider_element_list:
            provider_element
        |   provider_element_list provider_element
    ;
provider_element:
            PROVIDER literal
        |   PROVIDER literal TYPE literal
    ;
hypervisor_element_list:
            hypervisor_element
        |   hypervisor_element_list hypervisor_element
    ;
hypervisor_element:
            HYPERVISOR literal
        |   HYPERVISOR literal TYPE literal
    ;
os_element_list:
            os_element
        |   os_element_list os_element
    ;
os_element:
            OS literal
        |   OS literal TYPE literal
    ;
application_list:
            application_element
        |   application_element_list application_element
    ;
application_element:
            APPLICATION literal
        |   APPICATION literal TYPE literal
    ;
element:
            NAME literal
        |   NAME literal TYPE literal
literal:
            STRING
```

APPENDIX 3

Example Xml specification

```
<TechnicalSpecification
XMLns:xsi="http://www.w3.org/2001/XMLSchema-instance"
xsi:noNamespaceSchemaLocation="TS.xsd">
    <RequirementGroup>
        <Value>Windows Server 2007</Value>
        <Attribute>
            <Type>Sequence</Type>
            <Value>1</Value>
        </Attribute>
```

APPENDIX 3-continued

Example Xml specification

```
<SubRequirementGroup>
    <Requirement>
        <Value>Memory</Value>
        <Attribute>
            <Type>Sequence</Type>
            <Value>1</Value>
        </Attribute>
        <Attribute>
            <Type>Minimum</Type>
            <Value>2048</Value>
        </Attribute>
        <Attribute>
            <Type>Recommended</Type>
            <Value>4096</Value>
        </Attribute>
    </Requirement>
    <Requirement>
        <Value>Disk</Value>
        <Attribute>
            <Type>Sequence</Type>
            <Value>2</Value>
        </Attribute>
        <Attribute>
            <Type>Minimum</Type>
            <Value>8G</Value>
        </Attribute>
        <Attribute>
            <Type>Recommended</Type>
            <Value>20G</Value>
        </Attribute>
    </Requirement>
</SubRequirementGroup>
</RequirementGroup>
</VendorTechnicalSpecification>
```

What is claimed is:

1. A method of consuming a high-level design or computer architecture representation and generating manufacturing methods capable of manufacturing computer systems contained in the specification, comprising:
receiving a source data stream
parsing the source data stream by a language parser in reference to a grammar that includes a requirement of memory having attributes of sequence, minimum and recommended and a requirement of disk having attributes of sequence, minimum and recommended;
populating a storage medium with a plurality of application programming interfaces (api's), commands, and vendor implementation specifications for specific technologies required for architectures generated by the language parser; and
optimizing the inputs; and
creating relationships between commands and groups of commands or api's that are required to implement portions of the architecture; and
storing results of the optimizing in the storage medium.

2. The method of claim 1, further comprising further populating the storage medium with supplemental attributes.

3. The method of claim 1, further comprising employing a compiling algorithm to retrieve inputs and a high-level design stored in an architectural specification language from the storage medium and produce a plurality of system manufacturing applications.

4. The method of claim 2, further comprising employing a compiling algorithm to retrieve from the storage medium a high-level design stored in an architectural specification language and inputs and/or supplemental attributes, and produce a plurality of system manufacturing applications.

5. The method of claim 1, further comprising deconstructing the source data stream into reusable elements.

6. The method of claim 5, further comprising reusing the reusable elements in a plurality of system manufacturing applications.

7. The method of claim 1, further comprising deconstructing the source data stream into intermediate reusable elements.

8. The method of claim 7, further comprising reusing the reusable intermediate elements in a plurality of system manufacturing applications.

9. A system for consuming a high-level design or computer architecture representation and generating manufacturing applications capable of manufacturing the computer systems contained in the specification, comprising:
a first language parser communicating with the storage medium and coupled to a computer network for parsing vendor implementation specifications, api's, and commands into individual inputs parser in reference to a grammar that includes a requirement of memory having attributes of sequence, minimum and recommended and a requirement of disk having attributes of sequence, minimum and recommended and value pairs and records those inputs to the storage medium;
an optimization processor communicating with the storage medium and coupled to a computer network for optimizing parsed inputs and creates relationships and records those inputs to the storage medium;
a second language parser communicating with the storage medium and coupled to a computer network for parsing computer architecture representations and records those inputs to the storage medium;
a compiling processor communicating with the storage medium and coupled to a computer network for retrieving inputs from the storage and generating a plurality of system manufacturing applications; and
a manufacturing server coupled to a computer network and having memory and processor for storing and executing the manufacturing applications;
the server being operative to conduct a manufacturing transaction with a user and either delivering the manufacturing applications to the user or executing the manufacturing applications directly.

10. The system of claim 9, further comprising a third language parser communicating with the storage medium and coupled to a computer network for parsing supplemental attributes into individual inputs and value pairs and records those inputs to the storage medium.

11. The system of claim 9, further comprising a deconstuctor communicating with the second language parser for deconstructing the source data stream into reusable elements.

12. The system of claim 11, further comprising a component communicating with the deconstuctor for reusing the reusable elements in a plurality of system manufacturing applications.

13. The system of claim 9, further comprising a deconstuctor communicating with the second language parser for deconstructing the source data stream into intermediate reusable elements.

14. The system of claim 11, further comprising a component communicating with the deconstuctor for reusing the intermediate reusable elements in a plurality of system manufacturing applications.

15. A non-transitory computer medium comprising:
a data structure instantiating code segment that establishes a storage record in memory having a command/api identifier;

a data structure instantiating code segment that establishes a storage record in memory having:
  an architecture specification identifier;
  a plurality of technical input records and business input records, each maintaining a pointer to the architecture specification identifier; and
  computer instructions for:
    deconstructing the computer architecture representation; and
    identifying commands to execute in order to create the architecture represented constructing and compiling manufacturing applications necessary to execute identified commands;
  a plurality of separate command or api records, each maintaining a pointer to the command/api identifier;
  computer instructions for:
    deconstructing a high-level design;
    identifying commands to execute in order to create the architecture represented; and
    constructing and compiling manufacturing applications necessary to execute identified commands.

16. The non-transitory computer medium of claim 15, the architecture specification identifier further comprising: the high level design stored in the architectural specification language, the architectural specification language comprising a grammar that includes a requirement of memory having attributes of sequence, minimum and recommended and a requirement of disk having attributes of sequence, minimum and recommended.

17. The non-transitory computer medium of claim 15, further comprising computer instructions for deconstructing the source data stream into reusable elements.

18. The non-transitory computer medium of claim 17, further comprising computer instructions for reusing the reusable elements in a plurality of system manufacturing applications.

19. The non-transitory computer medium of claim 15, further comprising computer instructions for deconstructing the source data stream into intermediate reusable elements.

20. The non-transitory computer medium of claim 19, further comprising computer instructions for reusing the reusable intermediate elements in a plurality of system manufacturing applications.

* * * * *